(12) United States Patent
Matsumoto

(10) Patent No.: US 6,807,746 B2
(45) Date of Patent: Oct. 26, 2004

(54) LINEAR GUIDE APPARATUS

(75) Inventor: Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/373,056

(22) Filed: Feb. 26, 2003

(65) Prior Publication Data

US 2004/0020067 A1 Feb. 5, 2004

(30) Foreign Application Priority Data

Feb. 28, 2002 (JP) .................................. P. 2002-054802
Dec. 11, 2002 (JP) .................................. P. 2002-359483

(51) Int. Cl.$^7$ .............................................. G01B 3/00
(52) U.S. Cl. ........................................................ 33/706
(58) Field of Search ............................ 33/706, 707, 708

(56) References Cited

U.S. PATENT DOCUMENTS

| | | | |
|---|---|---|---|
| 4,553,793 A | * 11/1985 | Teramachi | 384/45 |
| 4,631,830 A | * 12/1986 | Rieder et al. | 33/707 |
| 4,743,124 A | 5/1988 | Blaurock | |
| 5,104,238 A | 4/1992 | Kasai | |
| 5,250,126 A | * 10/1993 | Ohya et al. | 148/569 |
| 5,618,114 A | * 4/1997 | Katahira | 384/45 |
| 6,510,614 B1 | * 1/2003 | Kato et al. | 33/1 M |
| 6,516,534 B2 | * 2/2003 | Chen et al. | 33/706 |
| 2001/0051009 A1 | 12/2001 | Shimizu et al. | |

FOREIGN PATENT DOCUMENTS

GB 2 142 098 A 1/1985

* cited by examiner

*Primary Examiner*—Christopher W. Fulton
(74) *Attorney, Agent, or Firm*—Sughrue Mion, PLLC

(57) ABSTRACT

A linear guide apparatus has a guide rail having a rolling-element rolling groove formed on a side thereof along in an axial direction; and a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on the both axial ends of the rolling-element rolling groove of the slider, wherein a maximum value of sum of load in an axial direction applied on the crowing portion on the both axial ends of the slider by the rolling elements is set to be smaller than a maximum value of load in the axial direction applied on one of the crowning portions of the slider by one rolling element.

3 Claims, 8 Drawing Sheets

LINEAR GUIDE APPARATUS

BACKGROUND OF THE INVENTION

1. Field of the Invention

The present invention relates to a linear guide apparatus for use in machine tools, industrial machines, etc.

2. Description of the Related Art

A linear guide apparatus, as a linear guide for use in a machining center as a machine tool, a robot as an industrial machine, etc., has been known. As shown in FIGS. 16, 17A and 17B, this linear guide apparatus comprises a guide rail 2 having a rolling-element rolling groove 1 formed on both sides thereof in the axial direction and a slider 3 which fits in the guide rail 2. Provided on the inner surface of the slider 3 is a rolling-element rolling groove 4 disposed opposed to the rolling-element rolling groove 1 of the guide rail 2. A number of rolling elements 5 are rollably interposed between the rolling-element rolling grooves 1, 4. In this arrangement, the slider 3 makes relative movement with the rolling elements 5 along the axis of the guide rail 2.

In this linear guide apparatus, the slider 3 has an end cap 6 provided on both axial ends thereof. The end cap 6 has a circulating path 7 forming a curved path communicating to the rolling-element rolling grooves 1, 4 for circulating rolling elements.

As shown in FIG. 18, the slider 3 may have a slow inclination called crowning portion 8 provided at both ends thereof for relaxing stress concentration. It is known that the provision of the crowning portion 8 makes it possible to enhance durability. On the other hand, the crowning portion 8 has an effect on the degree of change of sliding resistance of the slider 3 of the linear guide apparatus during movement. This change of sliding resistance has an adverse effect on the performance of machines comprising the linear guide apparatus. For example, the positioning properties of the machines are deteriorated to disadvantage. It has thus been desired to reduce the change of sliding resistance.

However, the selection of the crowning form for inhibiting the change of sliding resistance has heretofore been often experimentally made. Therefore, in order to realize a rolling linear guide having a reduced change of sliding resistance, production on a trial basis and by experiments must be repeated, requiring much labor.

SUMMARY OF THE INVENTION

The present invention has been worked out under these circumstances. An aim of the present invention is to provide a linear guide apparatus which has a reduced change of an axial component of contact load of a slider at a crowning portion with movement of rolling elements to exhibit a reduced change of sliding resistance.

Another aim of the present invention is to provide a linear guide apparatus suitable for uses in situations requiring a reduced change of sliding resistance such as in an electric discharge machine, a mold processing machine, a drawing device, a semiconductor producing machine (exposing device), and a precision measuring instrument.

In order to accomplish the aforementioned aims of the present invention, the present invention lies in a linear guide apparatus having a guide rail having a rolling-element rolling groove formed on a side thereof along an axial direction, and a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on both axial ends of the rolling-element rolling groove of the slider, wherein a maximum value of a total load in an axial direction applied on the crowing portions on the axial ends of the slider by the rolling elements is set to be smaller than a maximum value of load in the axial direction applied on one of the crowning portions of the slider by one rolling element.

In other words, the linear guide apparatus is arranged such that the load in the axial direction applied on the rolling elements at the right and left crowning portions cancel each other. In this arrangement, the sum of the load applied on the rolling elements at the right and left crowning portions is set to be smaller than the maximum value of the load in the axial direction applied on the slider at one of the crowning portions by the rolling elements.

At the portion free of crowning portion, the direction of contact load of the rolling elements with the rolling groove is perpendicular to the axial direction. Therefore, the contact load at this portion has no axial component.

However, at the portion having a crowning portion, the contact load of the rolling element with the rolling groove has an axial component. The magnitude of this axial component normally changes with the movement of the rolling elements. This is attributed to the fact that the arrangement of the crowning portion causes the change of the rolling elements and the rolling groove and hence the change of the contact load and the direction of contact of the rolling elements with the rolling groove changes.

The change of the axial load generated at the crowning portion causes the sum of the load in the axial direction applied on the slider by the crowning portion at both ends to change with the movement of the slider (i.e., movement of the rolling elements). This change of the load in the axial direction directly leads to the change of the sliding resistance of the slider.

In accordance with the present invention, these axial loads can cancel each other at the right and left crowning portions. In this arrangement, the axial load acted on the slider can be predetermined to be smaller than the maximum value of the load in the axial direction applied on the slider at one of the crowning portions. In other words, the change of the sliding resistance of the slider can be reduced.

In addition to this, according to the present invention, it is preferable that a linear guide apparatus having a guide rail having a rolling-element rolling groove formed on a side thereof along in an axial direction, a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on the both axial ends of the slider, wherein the crowning portion is a linear crowning having a constant inclination angle θ and satisfying the following relationship:

$$0 < \theta(N \times t - Le) < \delta_o$$

wherein N represents an integer of 1 or more; t represents the distance between centers of the rolling elements (with separator) or a diameter of the rolling element (free of separator); Le represents the length of the non-crowning portion; and $\delta_o$, represents preload amount (diameter of rolling element based on the diameter of rolling element which gives zero elastic deformation at the non-crowning portion).

Further, according to the present invention, it is preferable that a linear guide apparatus having a guide rail having a rolling-element rolling groove formed on a side thereof along in an axial direction, and a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on the both axial ends of the slider, wherein the crowning portion is an arc crowning having a constant radius R and satisfying any of the following relationships (1) to (3):

$$Nt-Le \leq 0.5t \text{ and } 0.5\sqrt{2R\delta_o} < Nxt-Le < 1.5\sqrt{2R\delta_o}; \quad (1)$$

$$0.5t < Nxt-Le < 1.5\sqrt{2R\delta_o}; \text{ and} \quad (2)$$

$$t < \sqrt{2R\delta_o} \quad (3)$$

wherein N represents an integer of 1 or more; t represents the distance between centers of the rolling elements (with separator) or the diameter of the rolling element (free of separator); Le represents the length of the non-crowning portion; and $\delta_o$ represents preload amount (diameter of rolling element based on the diameter of rolling element which gives zero elastic deformation at the non-crowning portion).

BRIEF DESCRIPTION OF THE DRAWINGS

FIGS. 17A and 17B illustrate linear guide apparatus wherein FIG. 17A is a transverse sectional view of the linear guide apparatus and FIG. 17B is an enlarged view of part A of FIG. 17A.

DETAILED DESCRIPTION OF THE PREFERRED EMBODIMENTS

Embodiments of implementation of the present invention will be described hereinafter in connection with the attached drawings.

Figure 1:
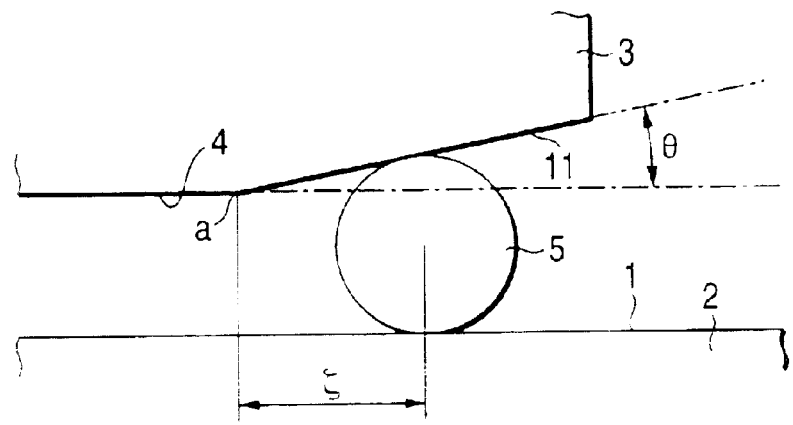
FIG. 1 is a longitudinal section of a linear crowning according to a first embodiment of the present invention.
Figure 16:
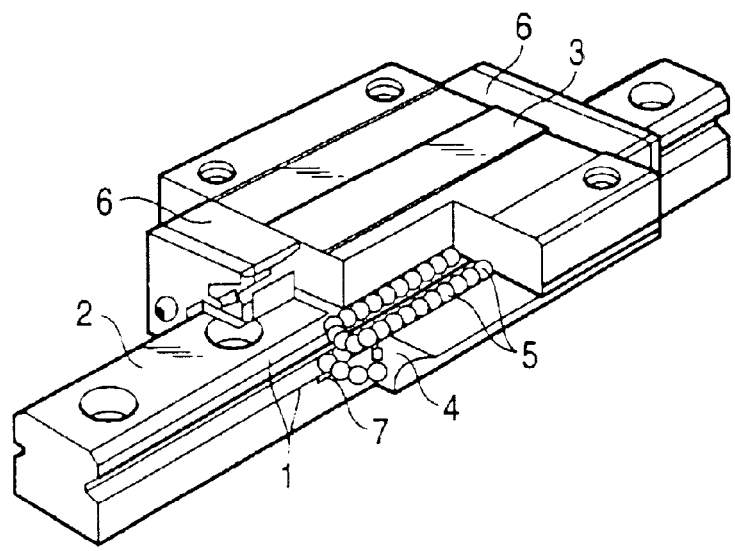
FIG. 16 is a partially cut away perspective view of a related art linear guide apparatus.
Figure 17A:
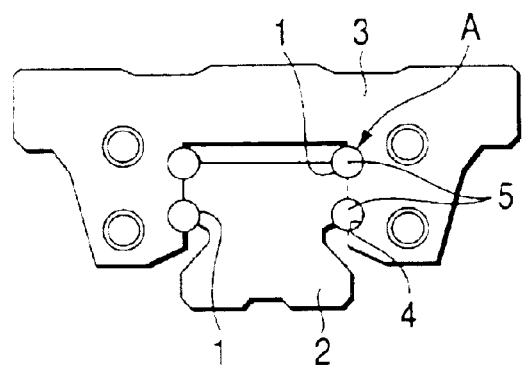
Figure 17B:
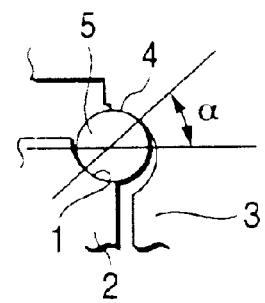
Figure 18:
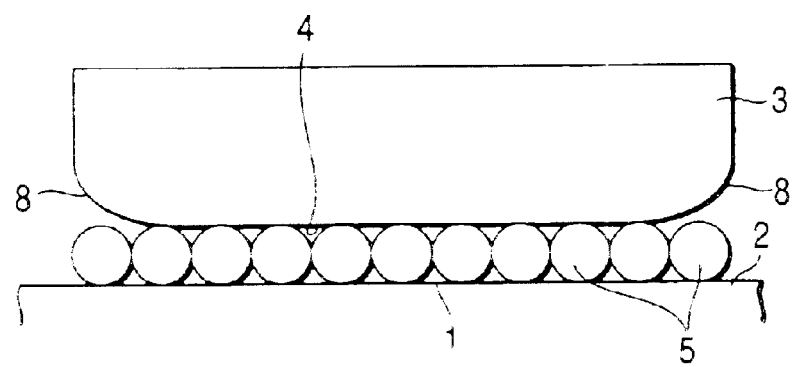
FIG. 18 is a diagram illustrating a crowning portion of the linear guide apparatus of FIGS. 17A and 17B.

FIG. 1 illustrates a first embodiment of the present invention. Where in the parts are the same as those of the related art linear guide apparatus of FIGS. 16 to 18, the same numerals are used and their description will be omitted. As shown in FIG. 1, a slider 3 which makes relative movement along the axis of a guide rail 2 with rolling elements 5 has a linear crowning 11 disposed at both ends thereof.

Both the right and left linear crownings 11 have the same shape and a constant inclination angle θ. The rolling element 5 acts as a ball crowning. Supposing that the distance in the axial direction from the crowning starting point a over the rolling element 5 of the linear crowning 11 is ξ, the following equation is established.

$$y = \theta \xi$$

(y: Crowning in the direction of contact of rolling element)

$$Q = k_n(\delta_0 - \theta\xi)^{1.5} = Q_0\left(1 - \frac{\xi}{L_{CL}}\right)^{1.5}$$

(Q: contact load)

$$F = Q\sin\theta \approx Q\theta = Q_0\theta\left(1 - \frac{\xi}{L_{CL}}\right)^{1.5}$$

(F: magnitude of axial component of contact load)
wherein θ: Angle of inclination of crowning $\delta_0$: Preload amount of rolling element at portion free of crowning on race when unloaded (diameter of rolling element based on the diameter of rolling element which gives zero elastic deformation)

$k_n$: Constant determined by Hertz's theory $L_{CL} = \delta_0/\theta$ $Q_0 = k_n\delta_0^{1.5}$ Among the rolling elements 5 disposed in the linear crowning 11, only the rolling elements 5 satisfying the relationship $\xi \leq L_{CL}$ are given a load. Let us firstly suppose the case where the maximum number of the rolling elements 5 given a load at the linear crowing 11 is 1, i.e., $L_{CL} \leq t$.

Figure 2:
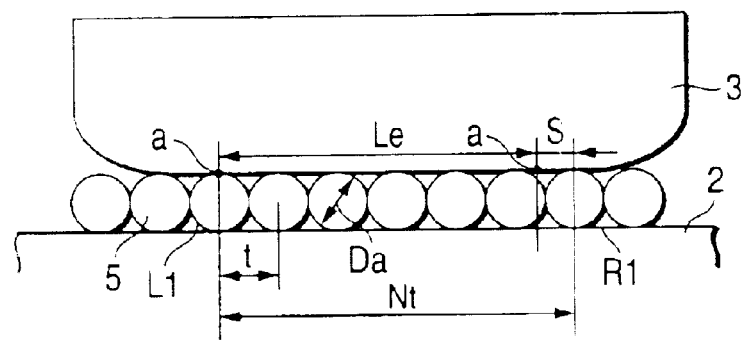
FIG. 2 is a diagram of the first embodiment of the present invention illustrating the state that the center of rolling element L1 is positioned at the left crowning starting point.

Let us then suppose the state that the center of the rolling element Li is positioned at the left crowning starting point a as shown in FIG. 2. The rolling elements 5 juxtaposed in the rolling-element rolling grooves 1 and 4 are all disposed in a line at a constant distance t between the centers thereof. The symbol t indicates the distance between the center of the rolling elements 5 with a separator 12, if any, interposed between the rolling elements (as shown in FIG. 3).

In the case where there is no separator 12 disposed between the rolling elements 5 (as shown in FIG. 2), t is the same as the diameter Da of the rolling element 5. Examples of the separator 12 include a gathering of separated separators 12 and a series combination of separators 12. Either of these separators 12 may be used. These separators 12 may occasionally have no rolling element 5 present on some portion of the ends thereof. However, this portion free of rolling element accounts for a small proportion in the total area and thus can be neglected.

Figure 3:
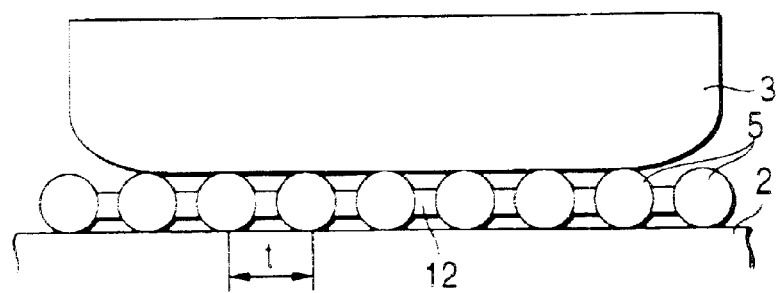
FIG. 3 is a diagram of the first embodiment of the present invention wherein a separator is disposed between the rolling elements.

In the state shown in FIG. 3, the rolling element 5 disposed leftmost among the rolling elements 5 in the left crowning is designated as R1. The distance S from the center of the rolling element R1 to the right crowning starting point a is calculated by the following equation:

$$S = N \times t - Le$$

(N: integer selected satisfying $0 \leq S < t$)

Figure 4:
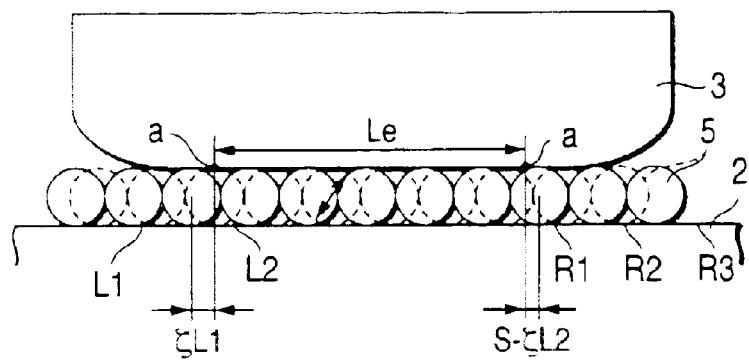
FIG. 4 is a diagram of the first embodiment of the present invention illustrating the state that the various rolling elements have moved leftward by $\xi_{L1}$.

Let us next suppose the state that the various rolling elements 5 each move leftward by $\xi_{L1}$ (as shown in FIG. 4). The disposition of the rolling elements 5 occurring when $\xi_{L1}$ rises to t is the same as that occurring when $\xi_{L1}$ is zero. Accordingly, the range of $\xi_{L1}$ may be considered to be $0 \leq \xi_{L1} \leq t$.

When $\xi_{L1}$ satisfies the relationship $0 \leq \xi_{L1} \leq t$, three rolling elements L1, R1 and R2 give an axial load to the slider 3. The axial loads $F_{L1}$, $F_{R1}$ and $F_{R2}$ applied on the slider 3 by the rolling elements 5 are represented by the following equations with the proviso that the rightward load is positive:

$$F_{L1} = Q_0 \theta \left(1 - \frac{\xi_{L1}}{L_{CL}}\right)^{1.5}$$

($F_{L1}$ is zero when $\xi_{L1}$ doesn't satisfy the relationship $0 \leq \xi_{L1} \leq L_{CL}$)

$$F_{R1} = -Q_0 \theta \left(1 - \frac{S - \xi_{L1}}{L_{CL}}\right)^{1.5}$$

($F_{R1}$ is zero when $\xi_{L1}$ doesn't satisfy the relationship $S - L_{CL} \leq \xi_{L1} \leq S$)

$$F_{R2} = -Q_0 \theta \left(1 - \frac{S + t - \xi_{L1}}{1}\right)^{1.5}$$

($F_{R2}$ is zero when $\xi_{L1}$ doesn't satisfy the relationship $S + t - L_{CL} \leq \xi_{L1} \leq S + t$)

The sum Fs of the axial loads applied on the slider 3 is represented by the following equation:

$$Fs = F_{L1} + F_{R1} + F_{R2}$$

Figure 5:
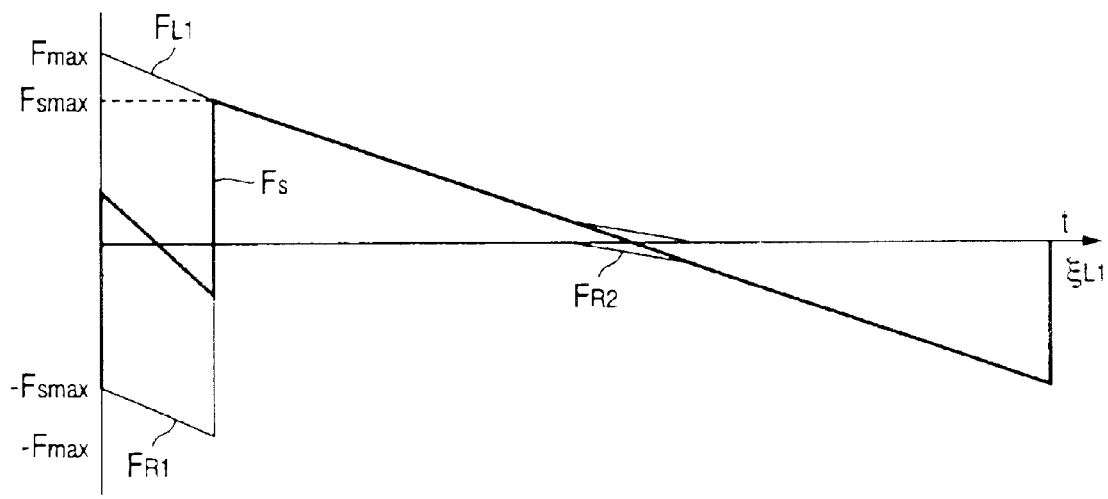
FIG. 5 is a diagram of the first embodiment of the present invention illustrating the axial load applied on the slider.

An example of the relationship between $\xi_{L1}$ and $F_{L1}$, $F_{R1}$, $F_{R2}$ and Fs is shown in FIG. 5. As $\xi_{L1}$ changes, Fs changes. In other words, as the rolling elements 5 move, the axial load given by the crowning portion changes. This change directly leads to the change of sliding resistance. The maximum value of the axial load applied on the slider 3 by one of the rolling elements 5 at the crowning portion is defined to be Fmax. Fmax is $Q_0 \theta$.

Figure 6:
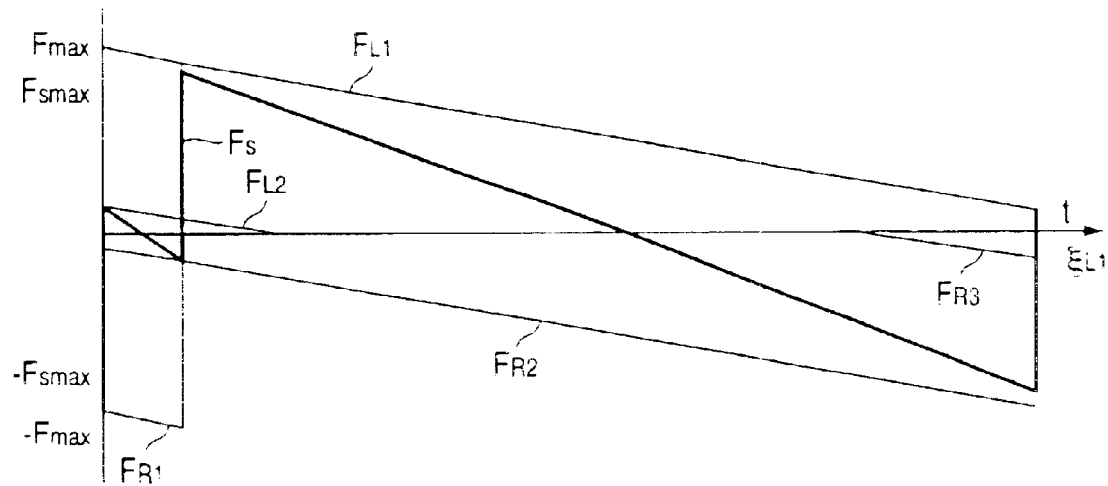
FIG. 6 is a diagram of the first embodiment of the present invention illustrating the axial load applied on the slider.

Let us next suppose the case where the maximum number of the rolling elements 5 given a load at the crowning portion is 2 or more ($L_{CL} > t$). Let us suppose the case where $t < L_{CL} \leq 2t$ by way of example. When $\xi_{L1}$ satisfies the relationship $0 \leq \xi_{L1} \leq t$, five rolling elements $L_1$, $L_2$, $R_1$, $R_2$ and $R_3$ give an axial load to the slider 3. The axial loads $F_{L1}$, $F_{L2}$, $F_{R1}$, $F_{R2}$ and $F_{R3}$ applied on the slider by the rolling elements are shown in FIG. 6. FIG. 6 shows the sum Fs of the axial loads applied on the slider.

Figure 7:
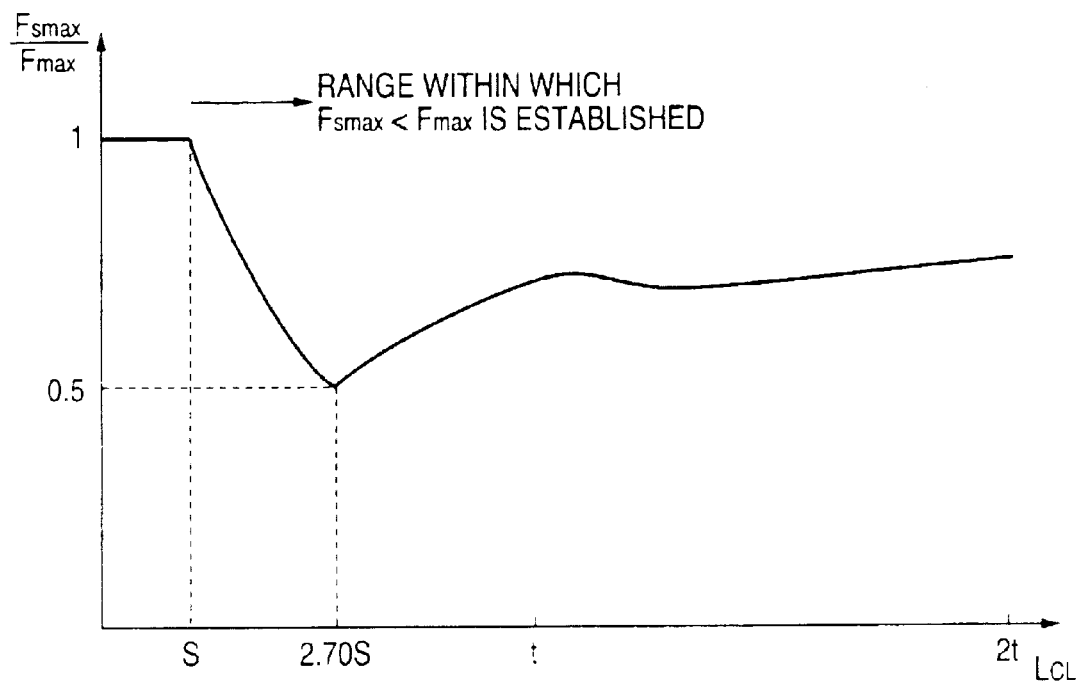
FIG. 7 is a diagram of the first embodiment of the present invention illustrating the change of Fsmax/Fmax with $L_{CL}$.
Figure 8:
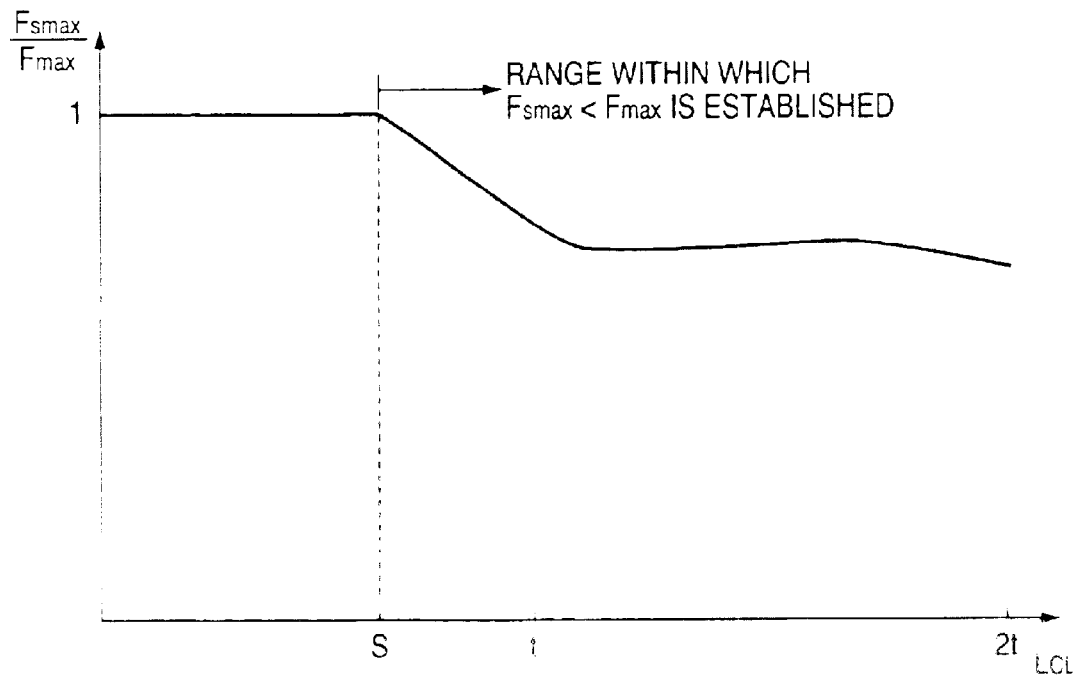
FIG. 8 is a diagram of the first embodiment of the present invention illustrating the change of Fsmax/Fmax with $L_{CL}$.

FIGS. 7 and 8 each illustrate the change of Fsmax/Fmax with $L_{CL}$. FIG. 7 illustrates the case where $0 < S < 0.370$ t. FIG. 8 illustrates the case where $0.370$ t $\leq S < t$. By selecting proper $L_{CL}$, the relationship Fsmax<Fmax can be established. This is because when $L_{CL}$ is proper, the axial load given at the right and left crowning portions cancel each other.

When S is zero, the relationship Fsmax=Fmax can be established regardless of $L_{CL}$. FIGS. 7 and 8 each illustrate only the case where $0 \leq L_{CL} \leq 2t$. However, even when $L_{CL}$ falls outside this range, if S is not zero, the relationship Fsmax<Fmax can be established at $L_{CL}$ of not smaller than t regardless of $L_{CL}$.

As can be seen in FIGS. 7 and 8, the relationship Fsmax<Fmax can be established if the following relationship is satisfied. In other words, the maximum value of the axial load applied on the slider 3 can be predetermined to be smaller than the maximum value of the axial load applied on the crowning portion by one of the rolling elements.

$$0 < S < L_{CL} \qquad (1)$$

Further, in the case where $0 < S < 0.370t$, Fsmax/Fmax can be predetermined minimum when $L_{CL}$ is 2.70S.

The relationship (1) and the definition of S and $L_{CL}$ make it possible to establish the relationship Fsmax<Fmax if there is an integer N satisfying the following relationship:

$$0 < \theta(N \times t - Le) < \delta_0 \qquad (2)$$

The preload amount $\delta_0$ varies with the properties (rigidity, magnitude of sliding resistance, etc.) required for rolling linear guide apparatus. It is preferred that the aforementioned relationship be satisfied even for different $\delta_0$ values by the use of a slider having the same crowning shape. This is because the number of kinds of sliders to be designed and produced can be reduced.

Among uses requiring that the variation of sliding resistance be small, uses subject to varying load such as mold processing machine require some rigidity. In such uses, the preload amount $\delta_0$ in the linear guide apparatus is normally not smaller than 0.00002 Da. As can be seen in the relationship (2), when there is an integer N satisfying the relationship, the relationship Fsmax<Fmax is established if $\delta_0$ is not greater than 0.0002 Da.

$$0 < \theta(N \times t - Le) < 0.0002 Da \qquad (3)$$

On the other hand, uses requiring accurate position control such as semiconductor producing machine (exposing device) and precision measuring instrument require that the variation as well as the absolute value of sliding resistance be small. In such uses, the preload amount $\delta_0$ in the linear guide apparatus is normally not smaller than 0.0001 Da. As can be seen in the relationship (2), when there is an integer N satisfying the relationship, the relationship Fsmax<Fmax is established with any $\delta_0$ of not greater than 0.0001 Da.

$$0 < \theta(N \times t - Le) < 0.0001 Da \qquad (4)$$

In order to reduce the variation of sliding resistance in particular, Fsmax/Fmax may be predetermined to be minimum. As can be seen in FIG. 7, the conditions under which Fsmax/Fmax is minimum (0.5) give the following relationships:

$$0 < N \times t - Le < 0.370t \text{ and } \theta(N \times t - Le) = 0.370\delta_0 \quad (5)$$

It is normally difficult to strictly satisfy the relationship (5) due to restrictions such as error in processing. Let us then examine the conditions under which Fsmax/Fmax is smaller than e. These conditions give the following relationships:

$$0 < N \times t - Le < 0.370t \text{ and } \beta_{eL}\delta_0 < \theta(N \times t - Le)\gamma_{eL}\delta_0 \quad (6)$$

wherein $\beta_{eL}$ and $\gamma_{eL}$ each are a value determined by e. Table 1 shows $\beta_{eL}$ and $\gamma_{eL}$ values for various e values. For example, when e is 80%, $\beta_{eL}$ and $\gamma_{eL}$ are 0.138 and 0.658, respectively, as set forth in Table 1. Accordingly, when the following relationships are satisfied, the relationship Fsmax/Fmax<80% can be established.

$$0 < N \times t - Le < 0.370t \text{ and } 0.138\delta_0 < \theta(N \times t - Le) < 0.658\delta_0 \quad (6)$$

TABLE 1

| e | $\beta_{eL}$ | $\gamma_{eL}$ |
|---|---|---|
| 100% | 0 | 1 |
| 90% | 0.0678 | 0.785 |
| 80% | 0.138 | 0.658 |
| 70% | 0.212 | 0.552 |
| 60% | 0.289 | 0.457 |

Explaining next specific examples of the linear guide apparatus, the guide rail 2 has two lines of rolling-element rolling grooves 1 provided on both sides thereof and the slider 3 has a linear crowning 11 provided on both moving ends thereof. The rolling element 5 is a ball. The contact angle α is 50°.

EXAMPLE 1-1

Le satisfying the relationship Fsmax<Fmax for any $\delta_0$ of not smaller than 0.0001 Da Ball diameter: Da=5.56 mm Inclination of crowning: θ=0.001 rad Distance between the center of adjacent rolling elements: t=5.56 mm (free of separator)

The relationship (4) can be deformed to the following relationship:

$$N \times t - \frac{0.0001 \text{ Da}}{\theta} < Le < N \times t$$

Substituting various values for the factors in the foregoing relationship gives the following relationships for the range of Le:

5.00 mm<Le<5.56 mm (N=1)

10.6 mm<Le<11.1 mm (N=2)

43.9 mm<Le<44.5 mm (N=8)

Le is then selected from the aforementioned ranges (e.g., 44 mm). As a result, the relationship Fsmax<Fmax can be established for any $\delta_0$ of not smaller than 0.0001 Da, i.e., not smaller than 0.556 μm.

EXAMPLE 1-2 t satisfying the relationship Fsmax<Fmax for any $\delta_0$ of not smaller than 0.0002 Da Ball diameter: Da=5.56 mm Inclination of crowning: θ=0.001 rad Length of non-crowning portion: Le=46 mm The relationship (3) can be deformed to the following relationship:

$$\frac{Le}{N} < t < \frac{1}{N}\left(Le + \frac{0.0002 \text{ Da}}{\theta}\right)$$

wherein t is not smaller than Da. Substituting various values for the factors in the foregoing relationship gives the following relationships for the range of Le:

46.00 mm<t<47.1 mm (N=1)

23.0 mm<t<23.6 mm (N=2)

5.75 mm<t<5.89 mm (N=8)

The thickness of the separator 12 is then predetermined such that t falls within the aforementioned range (e.g., t=5.8 mm). As a result, the relationship Fsmax<Fmax can be established for any $\delta_0$ of not smaller than 0.0002 Da, i.e., not smaller than 1.11 μm.

EXAMPLE 1-3

Case of Determination of Le

Ball diameter: Da=5.56 mm

Inclination of crowning: θ=0.001 rad

Distance between the center of adjacent rolling elements: t=5.56 mm (free of separator)

Preload amount: $\delta_0$=0.004 mm

The conditions (2) under which the relationship Fsmax<Fmax is established can be deformed to the following relationships:

$$N \times t - 0.370t < Le < N \times t \text{ and}$$

$$N \times t - \frac{\delta_0}{\theta} < Le < N \times t$$

Substituting various values for the factors in the foregoing relationship gives the following relationships:

3.50 mm<Le<5.56 mm 9.06 mm<Le<11.1 mm 42.4 mm<Le<44.5 mm 48.0 mm<Le<50.0 mm

By properly selecting Le from the aforementioned ranges, the relationship Fsmax<Fmax can be established.

Let us next consider the range within which the relationship Fsmax/Fmax<70% is established. The relationship (6) can be deformed to the following relationship:

$$N \times t - 0.370t < Le < N \times t \text{ and}$$

$$N \times t - \frac{\gamma_{eL}\delta_0}{\theta} < Le < N \times t - \frac{\beta_{eL}\delta_0}{\theta}$$

When e is 70%, $\beta_{eL}$ and $\gamma_{eL}$ are 0.212 and 0.552, respectively, as set forth in Table 1. Substituting various values for the factors in the foregoing relationships gives the following relationships for the range of Le. The Le value (Les) which gives minimum Fsmax/Fmax can be determined by the relationship (5).

3.50 mm<Le<4.71 mm, Les=4.08 mm (N=1)

9.06 mm<Le<10.3 mm, Les=9.64 mm (N=2)

42.4 mm<Le<43.6 mm, Les=43.0 mm (N=3)

48.0 mm<Le<49.2 mm, Les=48.6 mm (N=4)

By properly selecting Le from the aforementioned ranges, the relationship Fsmax/Fmax<70% can be established.

The closer to Les Le is, the smaller can be Fsmax/Fmax.

Figure 9:
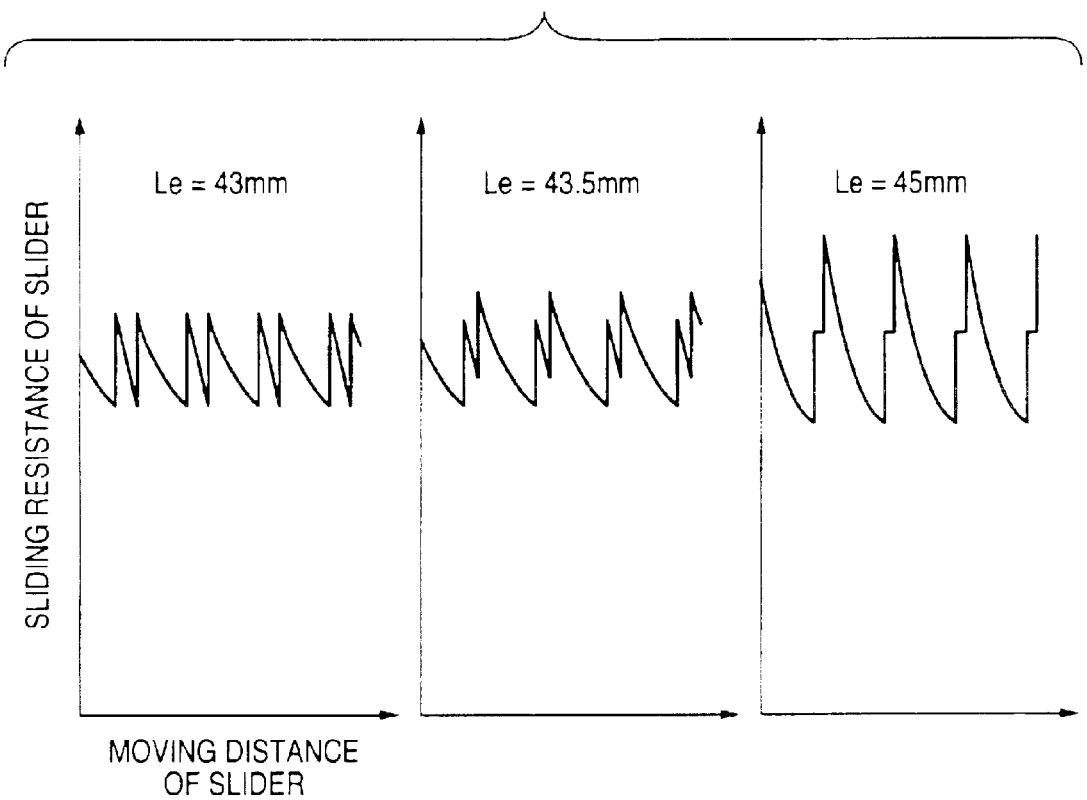
FIG. 9 is a graph of the first embodiment of the present invention illustrating the results of the change of sliding resistance with the movement of the slider.

The results (numerical analysis) of examination of change of sliding resistance with the movement of the slider 3 for Le of 43 mm, 43.5 mm and 45 mm are shown in FIG. 9. In FIG. 9, the abscissa indicates the moving distance of the slider 3 and the ordinate indicates the sliding resistance of the slider 3.

When Le is 45 mm, the relationship Fsmax<Fmax cannot be satisfied.

When Le is 43 mm or 43.5 mm, the relationship Fsmax/Fmax<70% can be satisfied.

The Le value of 43 mm gives minimum Fsmax/Fmax. Therefore, the variation of sliding resistance is particularly small.

As mentioned above, the advantage of the present invention can be confirmed.

EXAMPLE 1-4

Case of Determination of t

The preload amount in the linear guide apparatus is variously predetermined depending on the working conditions. In Example 1–3, in order to secure similar Fsmax/Fmax when the preload amount varies, it is necessary that the length of the non-crowning portion Le be changed. However, this approach is undesirable from the standpoint of production and stock control. Therefore, it is arranged such that the distance t between the center of the adjacent rolling elements varies with preload amount by disposing a separator 12 interposed between the rolling elements 5. The separator 12 can be easily mass-produced by injection molding or like methods. Even separators 12 having different thicknesses can be easily controlled in production and stock.

Ball diameter: Da=5.56 mm

Inclination of crowning: θ=0.0001 rad

Length of non-crowning portion: Le=46 mm

Preload amount: δd=0.004 mm

Let us next consider the conditions under which the relationship Fsmax/Fmax<80% is established. The relationship (6) can be deformed to the following relationships:

$$\frac{Le}{N} < t < \frac{Le}{N - 0.370} \text{ and } \frac{1}{N}\left(\frac{\beta_{eL}\delta_0}{\theta} + Le\right) < t < \frac{1}{N}\left(\frac{\gamma_{eL}\delta_0}{\theta} + Le\right)$$

When e is 80%, $\beta_{eL}$ and $\gamma_{eL}$ are 0.138 and 0.658, respectively, as set forth in Table 1. Le us next substitute various values for the factors in these relationships. Since t is not smaller than Da, the following relationships can be established for the range of t. The value of t (ts) which gives minimum Fsmax/Fmax can be determined by the relationship (5).

46.6 mm<t<48.6 mm, ts=47.5 mm (N=1)

23.3 mm<t<24.3 mm, ts=23.7 mm (N=2)

5.82 mm<t<6.03 mm, ts=5.93 mm (N=8)

The value of t is selected from the aforementioned ranges. The value of t is preferably as small as possible. This is because when the number of rolling elements in the rolling-element rolling grooves 1 and 4 increases, the load capacity increases. Further, the closer to ts the value of t is, the smaller can be Fsmax/Fmax. For example, when t is 5.9 mm, Fsmax/Fmax can be predetermined to be smaller than 80%.

Let us next suppose that the preload amount $\delta_0$ is 0.001 mm. In this case, too, the following relationships are established for the range of t and the value of ts:

46.1 mm<t<46.7 mm, ts=46.4 mm (N=1)

23.1 mm<t<23.3 mm, ts=23.2 mm (N=2)

5.76<t<5.83 mm, ts=5.8 mm (N=8)

The value of t is then selected from the aforementioned ranges. For example, when t is 5.8 mm, Fsmax/Fmax can be predetermined to be smaller than 80%.

As mentioned above, when separators 12 having different dimensions are used, similar Fsmax/Fmax values can be obtained even if different preload amounts are used with the same slider 3.

EXAMPLE 1-5

Case where the Range of Preload Amount is Known Le at which the Relationship Fsmax/Fmax<80% is Secured In Examples 1–3 and 1–4, sliders 3 or separators 12 having different dimensions were required. However, when the range of preload amount is previously known, a slider 3 and a separator 12 having the same dimension can be used to predetermine Fsmax/Fmax to be within a required range. This is advantageous in production and stock control.

Ball diameter: Da=5.56 mm

Inclination of crowning: θ=0.001 rad

Length of non-crowning portion: Le=46 mm

Minimum preload amount: δmin=0.002 mm

Maximum preload amount: δmax=0.008 mm

As can be seen in the relationship (6), when the following relationships are satisfied, Fsmax can be predetermined to be smaller than e for $\delta_0$ of from not smaller than δmin to not greater than δmax.

$$\frac{Le}{N} < t < \frac{Le}{N - 0.370} \text{ and } \frac{1}{N}\left(\frac{\beta_{eL}\delta_{max}}{\theta} + Le\right) < t < \frac{1}{N}\left(\frac{\gamma_{eL}\delta_{min}}{\theta} + Le\right)$$

When e is 80%, $\beta_{eL}$ and $\gamma_{eL}$ are 0.138 and 0.658, respectively, as set forth in Table 1. Let us next substitute various values for the factors in the aforementioned relationships. As a result, the following relationships are established for the range of t:

47.1 mm<t<47.3 mm (N=1)

23.6 mm<t<23.7 mm (N=2)

5.89 mm<t<5.91 mm (N:=8)

The value of t is then selected from the aforementioned ranges. For example, t is determined to be 5.9 mm. Then, Fsmax/Fmax can be predetermined to be smaller than 80%. As mentioned above, even when a slider 3 and a separator having the same dimension are used and different preload amounts are used, Fsmax/Fmax can be predetermined to be within the same range.

In the case where $\beta_{eL}\delta$max is not smaller than $\gamma_{eL}\delta$min, when the preload amount falls within a required range, Fsmax/Fmax cannot be predetermined to be smaller than e with the same value of t. In this case, it is necessary that a plurality of kinds of separators having different values of t be prepared.

Figure 10:
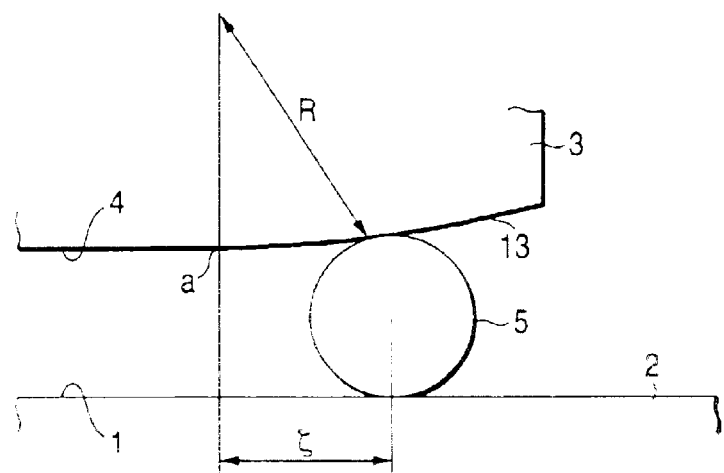
FIG. 10 is a longitudinal section of a second embodiment of the present invention illustrating an arc crowning.

FIG. 10 illustrates a second embodiment of the present invention which is an arc crowning 13. The arc crowning 13 comprises a right portion and a left portion having the same shape and a constant radius R. The rolling element 5 is a ball. Supposing that the distance of the rolling element 5 in the arc crowning 13 from the crowning starting point a is $\xi$, the following relationships are established:

$$y = \frac{\xi^2}{2R}$$

(y: crowning)

$$Q = k n \left(\delta_0 - \frac{\xi^2}{2R}\right)^{1.5} = Q_0 \left\{1 - \left(\frac{\xi}{L_{CR}}\right)^2\right\}^{1.5}$$

(Q: contact load)

$$F = Q\sin\theta \approx Q\frac{dy}{d\xi} = Q_0 \frac{\xi}{R} \left\{1 - \left(\frac{\xi}{L_{CL}}\right)^2\right\}^{1.5}$$

(F: magnitude of axial component of contact load)
wherein R: Radius of crowning portion $\delta_0$: Elastic deformation of ball at crowning-free portion on race when unloaded $k_n$: Constant determined by Hertz's theory $L_{CR} = \sqrt{2R\delta_0}$ $Q_0 = k_n 2\delta_0^{1.5}$ Let us consider hereinafter the arc crowning 13 similarly to the aforementioned linear crowning 11. Let us firstly suppose the case where the number of rolling elements given a load at the crowning portion is 1 or less, i.e., $L_{CR} \leq t$ (FIG. 2). Let us consider $0 \leq \xi_{L1} \leq t$. The rolling elements giving an axial load to the slider 3 are rolling elements L1, R1 and R2. Supposing that the distance of the rolling element L1 from the left crowning starting point is $\xi_{L1}$, the axial load Fs applied on the slider 3 is represented by the following equation:

$$Fs = F_{L1} + F_{R1} + F_{R2}$$

$F_{L1}$, $F_{R1}$ and $F_{R2}$ are represented by the following equations:

$$F_{L1} = Q_0 \frac{\xi_{L1}}{R} \left\{1 - \left(\frac{\xi_{L1}}{L_{CR}}\right)^2\right\}^{1.5}$$

$$F_{R1} = -Q_0 \frac{D - \xi_{L1}}{R} \left\{1 - \left(\frac{D - \xi_{L1}}{L_{CR}}\right)^2\right\}^{1.5}$$

$$F_{R2} = Q_0 \frac{D + t_w - \xi_{L1}}{R} \left\{1 - \left(\frac{D + t_w - \xi_{L1}}{L_{CR}}\right)^2\right\}^{1.5}$$

Figure 11:
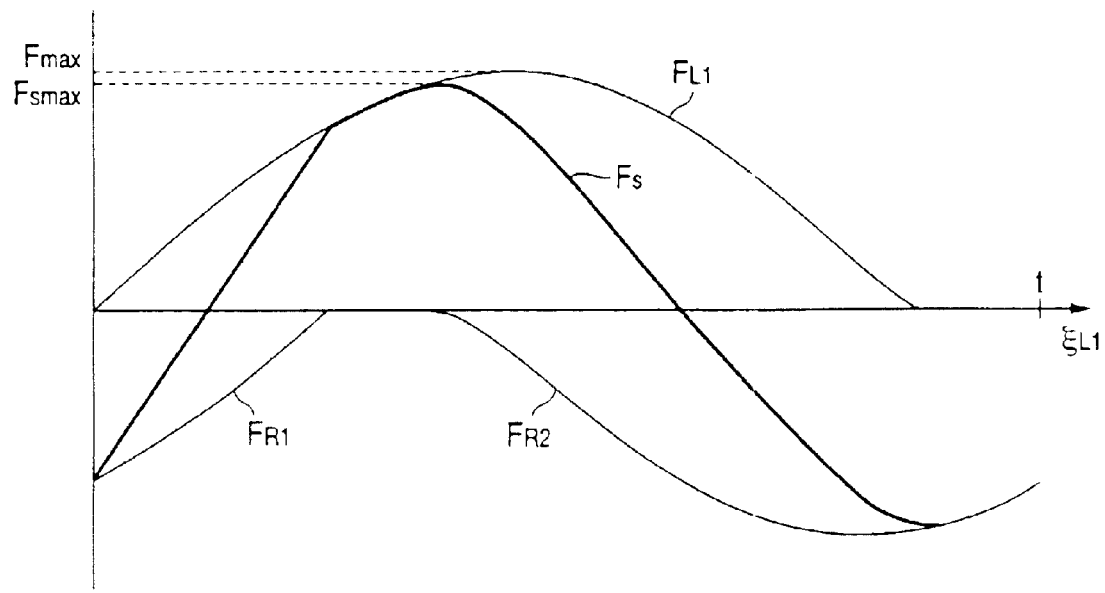
FIG. 11 is a diagram of the second embodiment of the present invention illustrating the axial load applied on the slider.

The relationship between $\xi_{L1}$ and $F_{L1}$, $F_{R1}$, $F_{R2}$ and Fs is shown in FIG. 11. The maximum value of the axial load applied on the slider 3 by one of the rolling elements in the crowning portion is defined to be Fmax. Fmax is represented by the following equation:

$$F\max \times \frac{3\sqrt{3}\, Q_0 L_{CR}}{16R}$$

Figure 12:
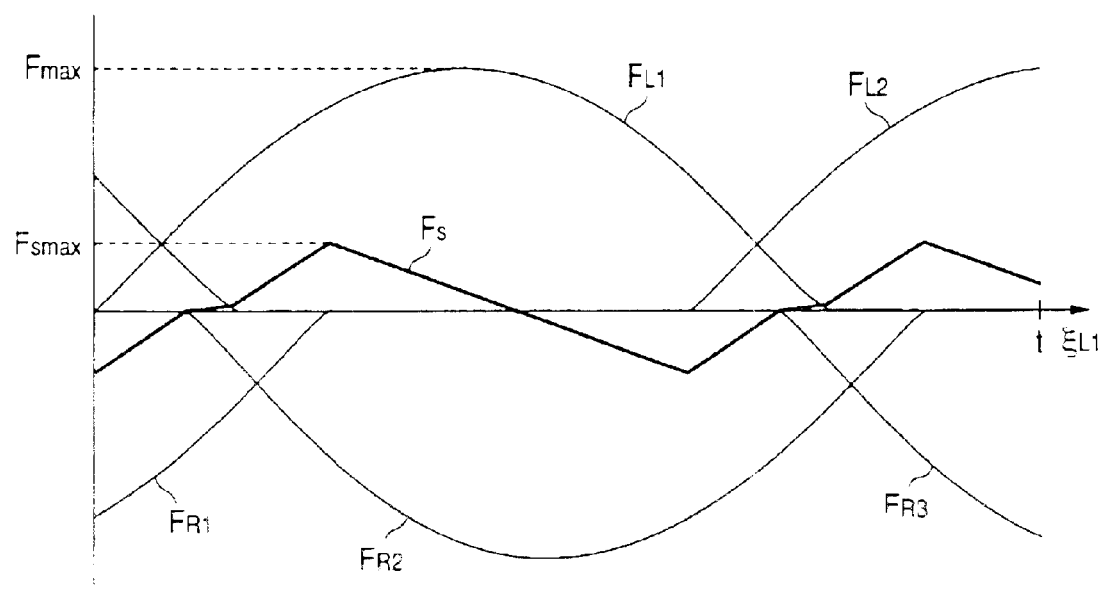
FIG. 12 is a diagram of the second embodiment of the present invention illustrating the axial load applied on the slider.

Let us next consider the case where there are two or more rolling elements 5 given a load at the crowning portion ($L_{CR} > t$). Let us consider the case of $t < L_{CR} \leq 2t$ by way of example. When $\xi_{L1}$ falls within the range of from not smaller than 0 to not greater than t, the five rolling elements L1, L2, R1, R2 and R3 give a load in the axial direction. The axial loads $F_{L1}$, $F_{L2}$, $F_{R1}$, $F_{R2}$ and $F_{R3}$ applied on the slider 3 by the rolling elements 5 are shown in FIG. 12. FIG. 12 indicates the sum Fs of axial loads applied on the slider 3.

Figure 13:
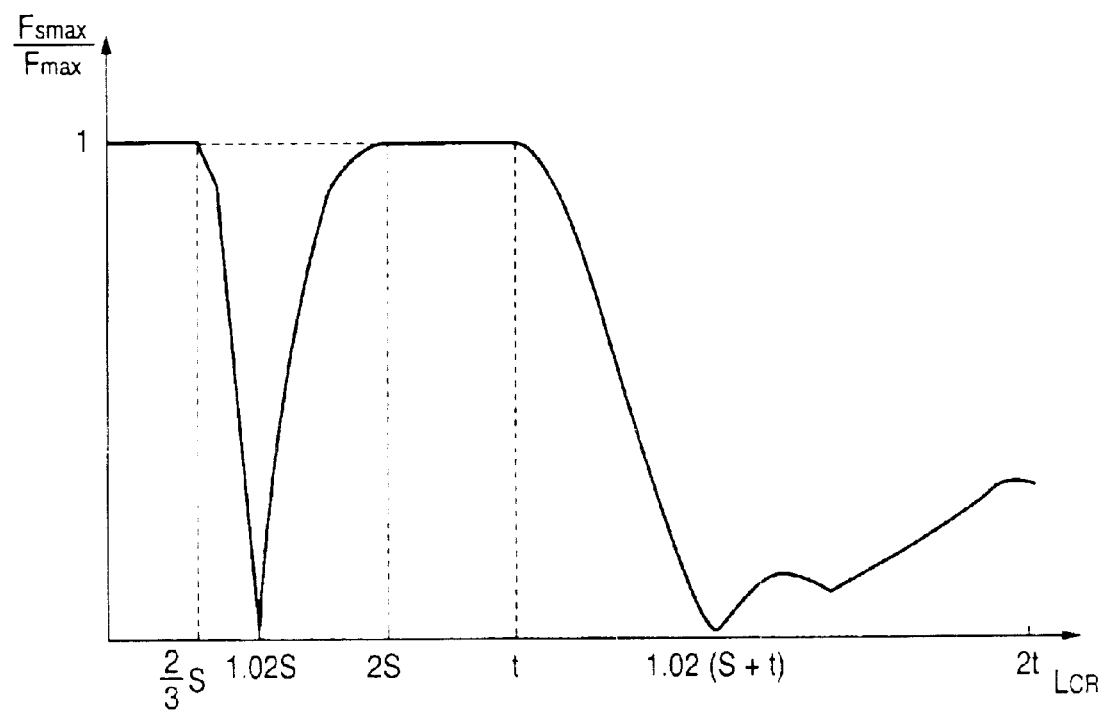
FIG. 13 is a diagram of the second embodiment of the present invention illustrating the change of Fsmax/Fmax with $L_{CR}$.
Figure 14:
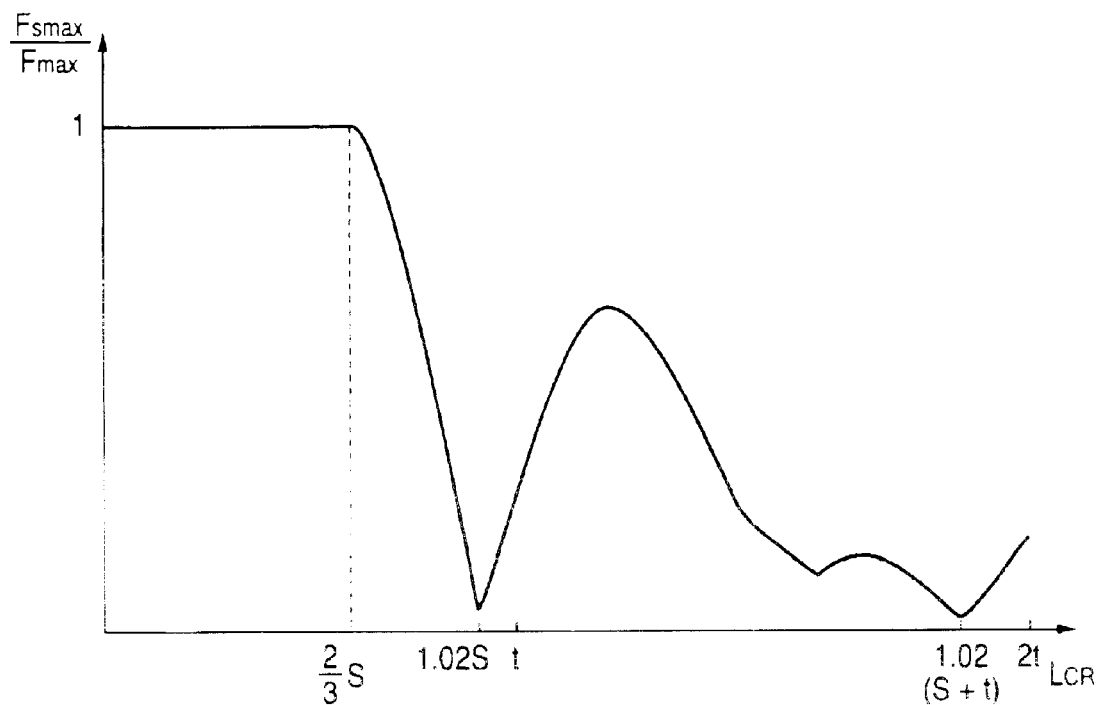
FIG. 14 is a diagram of the second embodiment of the present invention illustrating the change of Fsmax/Fmax with $L_{CR}$.

FIGS. 13 and 14 each illustrate the change of Fsmax/Fmax with $L_{CR}$. FIG. 13 illustrates the case of $0 \leq S \leq 0.5t$. FIG. 14 illustrates the case of $0.5t \leq S \leq t$. FIGS. 13 and 14 each illustrate only the case where $0 \leq L^{CR} \leq 2t$. However, even when $L_{CR}$ falls outside this range, the relationship Fsmax$\leq$Fmax can be established at $L_{CR}$ of not smaller than t regardless of $L_{CR}$.

As shown in FIGS. 13 and 14, when any of the clauses (1) to (3) of the relationship (11) is satisfied, Fsmax can be predetermined to be smaller than Fmax. In other words, the maximum value of the axial load acted on the slider 3 can be predetermined to be smaller than the maximum value of the axial load applied on the slider by one rolling element at the crowning portion.

$$S \leq 0.5t \text{ and } \frac{2}{3}S < L_{CR} < 2S \quad (1)$$

$$S > 0.5t \text{ and } \frac{2}{3}S < L_{CR} \quad (2)$$

(3) $L_{CR} < t$ \hfill (11)

Further, when the following relationships are satisfied, Fsmax/Fmax becomes minimum. The minimum value is substantially zero.

$$L_{CR} = 1.02(S + M \times t)$$

(M: integer of not smaller than 0)
Accordingly, when any of the clauses (1) to (3) of the following relationship (12) is satisfied, Fsmax can be predetermined to be smaller than Fmax.

(1) $N \times t - Le \leq 0.5t$ and $0.5\sqrt{2R\delta_0} < N \times t - Le < 1.5\sqrt{2R\delta_0}$ (2) $0.5t < N \times t - Le < 1.5\sqrt{2R\delta_0}$ (3) $t < \sqrt{2R\delta_0}$ \hfill (12)

The following relationships are established as in the case of linear crowning.

Conditions under which Fsmax<Fmax is established in uses requiring some rigidity (0.0002 Da<$\delta_0$):

$$0.5t < N \times t - Le < 1.5\sqrt{0.0004RDa} \text{ or } t < \sqrt{0.0004RDa} \quad (13)$$

Conditions under which Fsmax<Fmax is established in uses requiring a small sliding resistance (0.0001 Da<$\delta_0$):

$$0.5t < N \times t - Le < 1.5\sqrt{0.0002RDa} \text{ or } t < \sqrt{0.0002RDa} \quad (14)$$

Conditions under which Fsmax/Fmax is minimum:

$$N \times t - Le = 0.982\sqrt{2R\delta_0} \quad (15)$$

Conditions under which Fsmax/Fmax is smaller than e:

$$\beta_{eR}\sqrt{2R\delta_0} < N \times t - Le < \gamma_{eR}\sqrt{2R\delta_0} \quad (16)$$

The relationship between e and $\beta_{eR}$, $\gamma_{eR}$ is set forth in Table 2. For example, when e is 80%, the following relationship is established:

$$0.693\sqrt{2R\delta_0} < N \times t - Le < 1.29\sqrt{2R\delta_0}$$

TABLE 2

| e | $\beta_{eL}$ | $\gamma_{eL}$ |
|---|---|---|
| 100% | 0.5 | 1.5 |
| 90% | 0.635 | 1.36 |
| 80% | 0.693 | 1.29 |
| 70% | 0.737 | 1.24 |
| 60% | 0.776 | 1.20 |
| 50% | 0.811 | 1.15 |
| 40% | 0.844 | 1.12 |
| 30% | 0.877 | 1.08 |
| 20% | 0.910 | 1.04 |
| 10% | 0.946 | 1.01 |

Explaining next specific examples of the linear guide apparatus, the guide rail 2 has two lines of rolling-element rolling grooves 1 provided on both sides thereof and the slider 3 has an arc crowning 13 provided on both moving ends thereof. The rolling element 5 is a ball. The contact angle α is 50°.

EXAMPLE 2-1

Le satisfying the relationship Fsmax<Fmax for any $\delta_0$ of not smaller than 0.0002 Da Ball diameter: Da=5.56 mm Radius of crowning: R=2,000 mm Distance between the center of adjacent rolling elements: t=5.56 mm (free of separator)

The relationship (13) can be deformed to the following relationship:

$$N \times t - 1.5\sqrt{0.0004 R D a} < Le < (N - 0.5) \times t$$

Substituting various values for the factors in the foregoing relationship gives the following relationships for the range of Le:

2.40 mm<Le<2.78 mm (N=1)

7.96 mm<Le<8.34 mm (N=2)

46.9 mm<Le<47.3 mm (N=9)

Le is then selected from the aforementioned ranges (e.g., 47 mm). As a result, the relationship Fsmax<Fmax can be established for any $\delta_0$ of not smaller than 0.002 Da, i.e., not smaller than 1.11 μm.

EXAMPLE 2-2

Case of Determination of t

Ball diameter: Da=5.56 mm

Radius of crowning: R=2,000 mm

Length of non-crowning portion: Le=44 mm

Preload amount: $\delta_0$=0.004 mm

The conditions (12) under which the relationship Fsmax<Fmax is established can be deformed to the following relationships:

$$\frac{1}{N}(0.5\sqrt{2R\delta_0} + Le) < t < \frac{1}{N}(1.5\sqrt{2R\delta_0} + Le)$$

Substituting various values for the factors in the aforementioned relationship gives the following relationships because t is smaller than Da:

46.0 mm<t<50.0 mm (N=1)

23.0 mm<t<25.0 mm (N=2)

6.75 mm<t<7.14 mm (N=7)

5.75 mm<t<6.25 mm (N=8)

By properly selecting t from the aforementioned ranges, the relationship Fsmax<Fmax can be established. Let us next consider the range within which the relationship Fsmax/Fmax<60% is established. The relationship (16) can be deformed to the following relationship:

$$\frac{1}{N}(\beta_{eR}\sqrt{2R\delta_0} + Le) < t < \frac{1}{N}(\gamma_{eR}\sqrt{2R\delta_0} + Le)$$

When e is 60%, $\beta_{eR}$ and $\gamma_{eR}$ are 0.776 and 1.20, respectively, as set forth in Table 2. Substituting various values for the factors in the foregoing relationships gives the following relationships for the range of t. The Le value (ts) which gives minimum Fsmax/Fmax can be determined by the relationship (15).

47.1 mm<t<48.8 mm, ts=47.9 mm (N=1)

23.6 mm<t<24.4 mm, ts=24.0 mm (N=2)

6.73 mm<t<6.97 mm, ts=6.85 mm (N=7)

5.89 mm<t<6.10 mm, ts=5.99 mm (N=8)

By properly selecting t from the aforementioned ranges, the relationship Fsmax/Fmax<60% can be established. The closer to ts t is, the smaller-can be Fsmax/Fmax.

Figure 15:
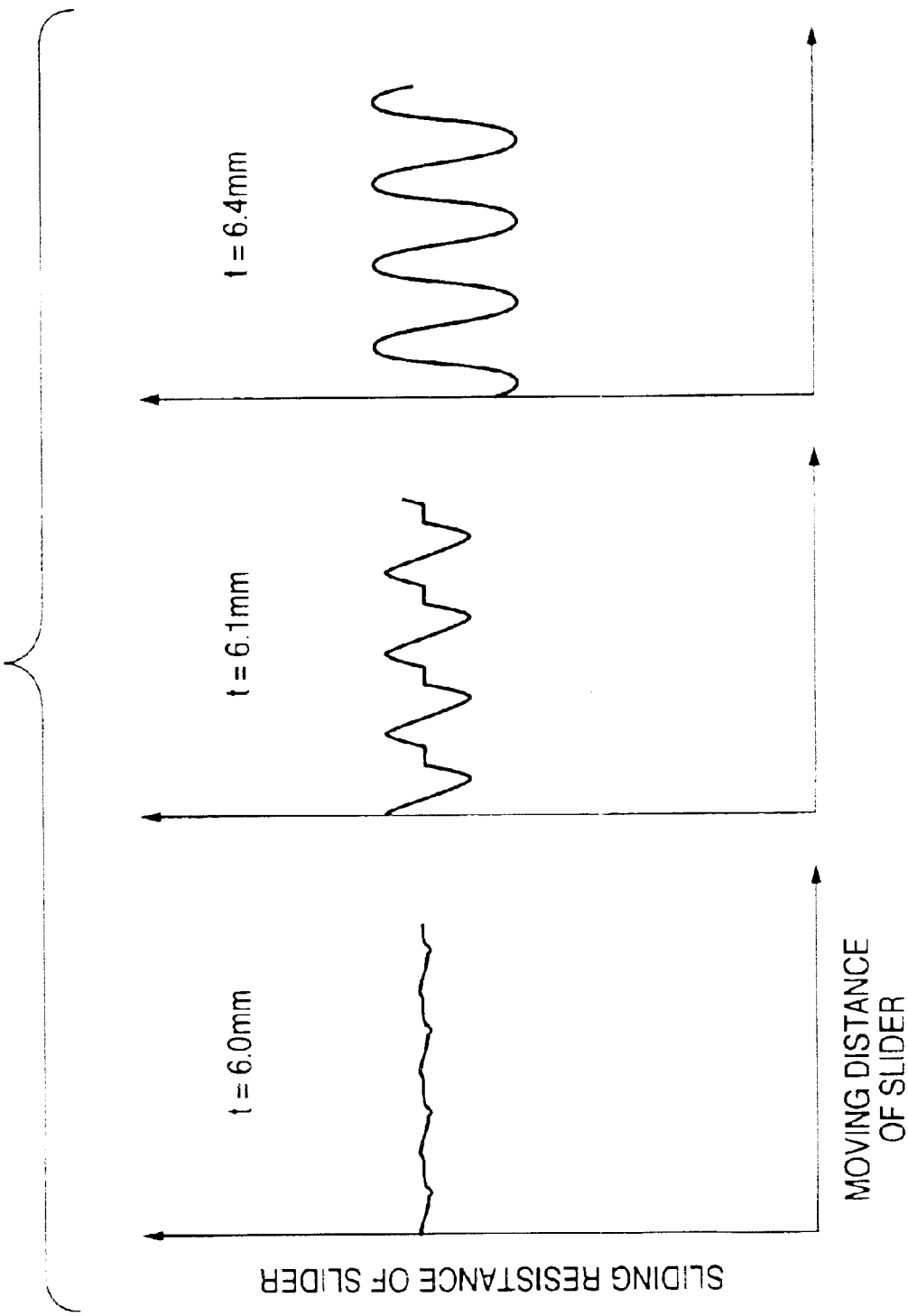
FIG. 15 is a graph of the second embodiment of the present invention illustrating the results of the change of sliding resistance with the movement of the slider.

The results (numerical analysis) of examination of change of sliding resistance with the movement of the slider 3 for t of 6.0 mm, 6.1 mm and 6.4 mm are shown in FIG. 15. In FIG. 15, the abscissa indicates the moving distance of the slider 3 and the ordinate indicates the sliding resistance of the slider 3.

When t is 6.4 mm, the relationship Fsmax<Fmax cannot be satisfied. The variation of sliding resistance is great.

When t is 6.0 mm or 6.1 mm, the relationship Fsmax/Fmax<60% can be satisfied. The variation of sliding resistance is great.

The t value of 6.0 mm is close to 5.99 mm, which value gives minimum Fsmax/Fmax. Therefore, the variation of sliding resistance is particularly small.

As mentioned above, the advantage of the present invention can be confirmed.

EXAMPLE 2-3

Case where the Range of Preload Amount is Known The relationship Fsmax/Fmax<80% is then secured.

Ball diameter: Da=5.56 mm

Radius of crowing: R=1,000 mm

Length of non-crowning portion: Le=46 mm

Minimum preload amount: δmin=0.002 mm

Maximum preload amount: δmax=0.006 mm

As can be seen in the relationship (16), when the following relationship is satisfied, Fsmax/Fmax can be predetermined to be smaller than e for $\delta_0$ of from not smaller than $\delta$min to not greater than $\delta$max.

$$\frac{1}{N}\left(\beta_{eR}\sqrt{2R\delta_{\max}} + Le\right) < t < \frac{1}{N}\left(\gamma_{eR}\sqrt{2R\delta_{\min}} + Le\right)$$

When e is 80%, $\beta_{eL}$ and $\gamma_{eL}$ are 0.693 and 1.29, respectively, as set forth in Table 2. Let us next substitute various values for the factors in the aforementioned relationship. As a result, the following relationships are established for the range of t:

46.5 mm<t<47.3 mm (N=1)

23.2 mm<t<23.7 mm (N=2)

5.81 mm<t<5.91 mm (N=8)

The value of t is then selected from the aforementioned ranges. For example, t is determined to be 5.9 mm. Then, Fsmax/Fmax can be predetermined to be smaller than 80%.

In the foregoing embodiments, as preload amount there was used the elastic deformation of rolling element unloaded. In order to further reduce the variation of sliding resistance, the elastic deformation $\delta_1$ of rolling element under the conditions that the reduction of variation of sliding resistance is important may be used instead of $\delta_0$. For example, in the case where the present invention is applied to machines on which a great external load is not acted such as semiconductor producing device, the elastic deformation $\delta_1$ of rolling element by its own weight may be used.

The aforementioned embodiments have been described with reference to the linear crowning 11 and the arc crowning 13. The conditions under which the relationship Fsmax<Fmax is established can be similarly found for other crowning forms.

In the case where crowning is represented by a function (y=f($\xi$)) of distance $\xi$ from the crowning starting point, the following equations can be established:

$$Q = k_n(\delta_0 - f(\xi))^{1.5} = Q_0\left(1 - \frac{f(\xi)}{\delta_0}\right)^{1.5} \quad (Q:\text{contact load}) \quad (A1)$$

$$F = Q\sin\theta \approx Q\frac{dy}{d\xi} = Q_0\frac{dy}{d\xi}\left(1 - \frac{f(\xi)}{\delta_0}\right)^{1.5} \quad (A2)$$

(F:magnitude of axial component of contact load)

wherein $\delta_0$: Elastic deformation of ball at crowning-free portion on race when unloaded $k_n$: Constant determined by Hertz's theory $Q_0 = k_n \delta_0^{1.5}$ As can be seen in the equation (A2), the magnitude of the axial load applied on one rolling element by the crowning portion can be obtained as a function of position $\xi$ of rolling element. Accordingly, $\xi$ is plotted as abscissa and F as ordinate. From this graph can be determined the maximum value Fmax of axial load F applied on the slide by one rolling element.

Let us next suppose the case where the number of rolling elements given a load in the crowning portion is 1 or less, i.e., $L_{CR} \leq t$, similarly to the case of linear and arc crownings. The rolling elements giving an axial load to the slider are rolling elements L1, R1 and R2. Supposing that the distance of the rolling element L1 from the left crowning starting point is $\xi_{L1}$, the axial load Fs applied on the slider is represented by the following equation:

$$Fs = F_{L1} + F_{R1} + F_{R2} \quad (A3)$$

wherein $F_{L1}$, $F_{R1}$ and $F_{R2}$ are respectively represented by the following equations:

$$F_{L1} = Q_0\frac{dy}{d\xi}\bigg|_{\xi=\xi_{L1}}\left(1 - \frac{f(\xi_{L1})}{\delta_0}\right)^{1.5} \quad (A4)$$

$$F_{R1} = -Q_0\frac{dy}{d\xi}\bigg|_{\xi=D-\xi_{L1}}\left(1 - \frac{f(D-\xi_{L1})}{\delta_0}\right)^{1.5} \quad (A5)$$

$$F_{R2} = -Q_0\frac{dy}{d\xi}\bigg|_{\xi=D+t-\xi_{L1}}\left(1 - \frac{f(D+t-\xi_{L1})}{\delta_0}\right)^{1.5} \quad (A6)$$

From the aforementioned equations (A3) to (A6) can be known the relationship between the coordinate $\xi_{L1}$ of the rolling element L1 and the sum Fs of axial loads applied on the slider. Accordingly, by graphically plotting the relationship between $\xi_{L1}$ and Fs, the maximum value Fsmax of the sum Fs of axial loads applied on the slider can be known.

The present embodiment has been considered with reference to the case of $L_{CR} \leq t$. In the case of $L_{CR} > t$, too, Fmax and Fsmax can be determined as already described in the case of linear and arc crownings.

As mentioned above, the maximum value Fmax of axial load applied on the slider by one rolling element and the maximum value Fsmax of the sum of axial loads applied on the slider by the rolling elements for the case where an arbitrary crowning form y=f($\xi$) is given can be known. Accordingly, the crowning form y=f($\xi$) giving Fmax>Fsmax can be found.

The present embodiment has been described only with reference to the case where the rolling element is a ball. For the case where the rolling element is a roller, too, the conditions under which Fsmax is smaller than Fmax can be found.

In the case where the rolling element is a roller, the crowning represented by y=f($\xi$) as a function of distance $\xi$ from the crowning starting point can be given the following equations:

$$Q = k_R(\delta_0 - f(\xi))^{1.11} = Q_0\left(1 - \frac{f(\xi)}{\delta_0}\right)^{1.11} \quad (Q:\text{contact load}) \quad (A7)$$

$$F = Q\sin\theta \approx Q\frac{dy}{d\xi} = Q_0\frac{dy}{d\xi}\left(1 - \frac{f(\xi)}{\delta_0}\right)^{1.11} \quad (A8)$$

(F:magnitude of axial component of contact load)

wherein $\delta_0$: Elastic deformation of ball at crowning-free portion on race when unloaded $k_n$: Constant determined by Hertz's theory $Q_0 = k_n \delta_0^{1.11}$ The foregoing equations (A7) and (A8) have the same form as the equations (A1) and (A2), in which the rolling element is a ball, except that they have different exponents. Accordingly, the crowning form y=f($\xi$) giving Fmax>Fsmax can be found in the same manner as in the case where the rolling element is a ball.

As mentioned above, in accordance with the present invention, the load in the axial direction applied on the slider at the right and left crowning portions cancel each other. In this arrangement, the axial load acted on the slider can be predetermined to be smaller than the maximum value of the axial load applied on the slider by one rolling element at one of the crowning portions. In other words, the change of the sliding resistance of the slider can be reduced.

What is claimed is:

1. A linear guide apparatus comprising:

a guide rail having a rolling-element rolling groove formed on a side thereof along in an axial direction; and a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on each of the axial ends of the rolling-element rolling groove of the slider, wherein a maximum value of a total load in an axial direction applied on the crowning portions on the axial ends of the slider by the rolling elements is set to be smaller than a maximum value of load in the axial direction applied on one of the crowning portions of the slider by one rolling element.

2. A linear guide apparatus comprising:

a guide rail having a rolling-element rolling groove formed on a side thereof along in an axial direction;

a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on each of the axial ends of the slider, wherein the crowning portion is a linear crowning having a constant inclination angle $\theta$ and satisfying the following relationship:

$$0 < \theta(N \times t - Le) < \delta_0$$

wherein N represents an integer of 1 or more;

t represents the distance between centers of the rolling elements (with separator) or a diameter of the rolling element (free of separator);

Le represents the length of the non-crowning portion; and $\delta_0$ represents preload amount (diameter of rolling element based on the diameter of rolling element which gives zero elastic deformation at the non-crowning portion).

3. A linear guide apparatus comprising:

a guide rail having a rolling-element rolling groove formed on a side thereof along in an axial direction; and a slider having a rolling-element rolling groove disposed so as to be opposed to the rolling-element rolling groove of the guide rail, the slider moving relatively in the axial direction of the guide rail with rolling elements rollably interposed between the two rolling-element rolling grooves, and a crowning portion disposed on the both axial ends of the slider, wherein the crowning portion is an arc crowning having a constant radius R and satisfying any of the following relationships (1) to (3):

$$Nt - Le \leq 0.5t \text{ and } 0.5\sqrt{2R\delta_0} < N \times t - Le < 1.5\sqrt{2R\delta_0}; \quad (1)$$

$$0.5t < N \times t - Le < 1.5\sqrt{2R\delta_0}; \text{ and} \quad (2)$$

$$t < \sqrt{2R\delta_0} \quad (3)$$

wherein N represents an integer of 1 or more;

t represents the distance between centers of the rolling elements (with separator) or the diameter of the rolling element (free of separator);

Le represents the length of the non-crowning portion; and $\delta_0$ represents preload amount (diameter of rolling element based on the diameter of rolling element which gives zero elastic deformation at the non-crowning portion).

* * * * *